April 6, 1965  R. S. WILKES  3,176,833
MATERIAL CONVEYOR
Filed Aug. 22, 1962
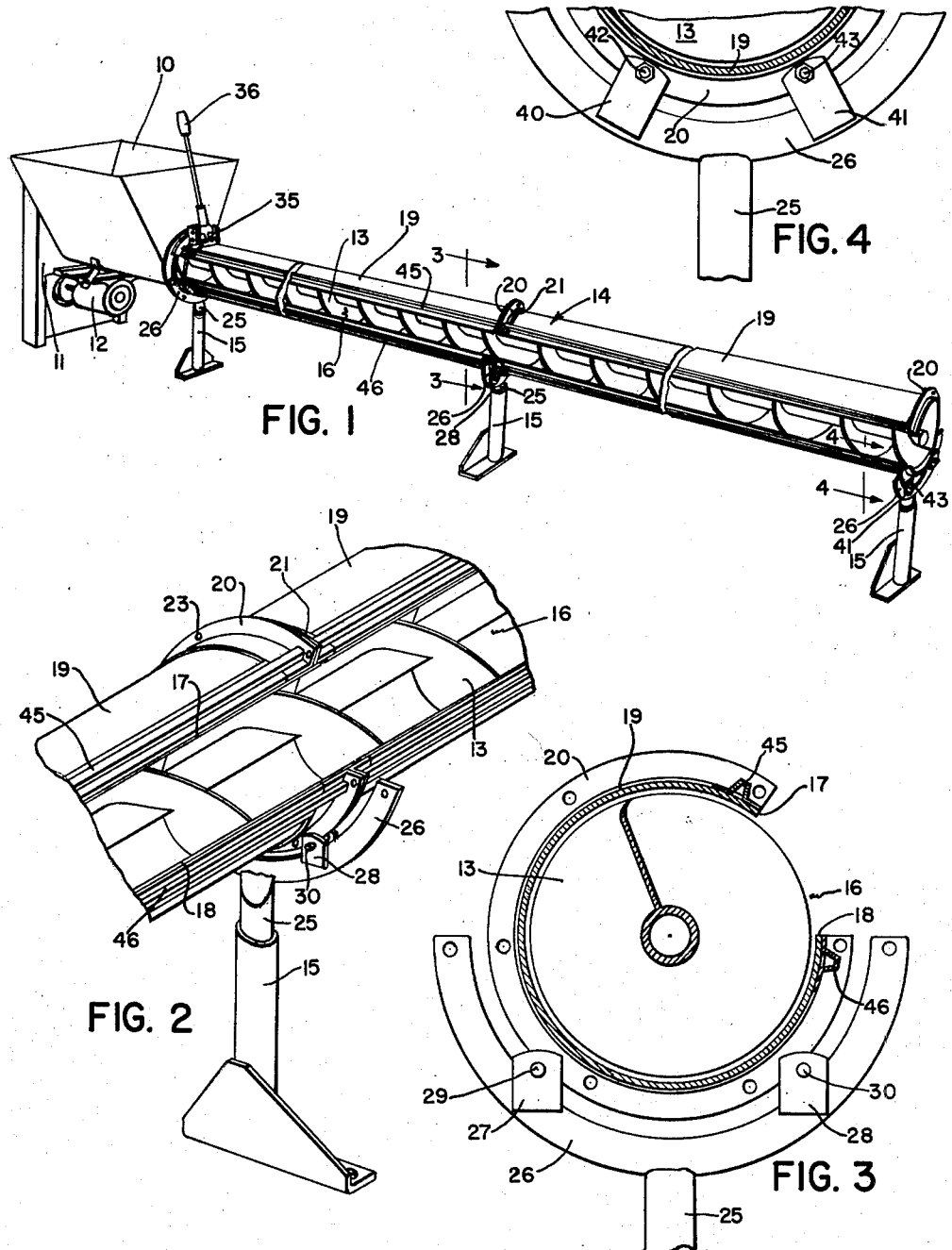
INVENTOR.
RAYMOND S. WILKES
BY William A. Murray
ATTORNEY

United States Patent Office 3,176,833
Patented Apr. 6, 1965

3,176,833
MATERIAL CONVEYOR
Raymond S. Wilkes, Moline, Ill., assignor to Deere & Company, Moline, Ill., a corporation of Delaware
Filed Aug. 22, 1962, Ser. No. 218,762
4 Claims. (Cl. 198—213)

This invention relates to a material conveying and discharge mechanism commonly known as a bunk feeder.

It is the primary object of the present invention to provide a bunk feeder normally supported adjacent the feeding trough of a livestock compound featuring a material receiving hopper at one end and an auger conveying mechanism extending from the hopper outwardly to a remote end. The auger conveying mechanism incorporates an auger tube having a side discharge slot extending the entire length of the tube. At the end of the tube adjacent the hopper there is provided an indexing mechanism which may swivel the tube about the axis of its auger. At the opposite end of the tube there is provided locking means to retain that end against angular movement. Consequently the edges of the slot may be inclined by swiveling the material receiving end of the tube.

It is a further object of the present invention to provide a reinforcing structure for the tube which is composed of C-shaped rings at opposite ends that are fixed to the surface of the tube with the openings thereof being substantially equal to the opening of the slot. Consequently material passing through the tube will not catch on the ring. The reinforcing structure will also include channel members which extend between the C-shaped rings and are adapted to be fixed to the surface of the tube with opposite ends thereof fixed to the respective C-shaped rings. The combination of the C-shaped rings and the reinforcing channels therefore afford a far more rigid structure for the tube so that torsional load, as provided by the indexing device, will effect uniform inclination of the tube edges throughout the length of the tube.

Other objects and advantages of the present invention will become apparent to those skilled in the art as the nature of the invention is better understood from the following description and as shown in the accompanying drawings.

FIG. 1 is a side perspective view of the bunk feeder.

FIG. 2 is a side perspective view of a midportion of the bunk feeder shown in FIG. 1.

FIG. 3 is an enlarged sectional view taken substantially along the line 3—3 of FIG. 1.

FIG. 4 is an enlarged end view showing a portion of the end of the bunk feeder.

Referring now to the drawings, there is provided at one end of the bunk feeder a material receiving hopper 10 supported on a stand 11 that may be supported on the base of a bunk feeder. An electric motor 12 is provided for the hopper and operates through a suitable drive to operate an auger 13 disposed in the base of the hopper 10 and extending outwardly into an outer tube assembly, indicated in its entirety by the reference numeral 14. The tube assembly 14 is supported on stands 15 fixed to the floor of a bunk feeder or in any other manner conventionally used in supporting bunk feeders.

The assembly 14 is composed of a series of connected tubes 19, C-shaped in cross section, with an elongated slot 16 opening to one side. Upper and lower edges 17, 18 define the upper and lower edges of the slot 16. The edges 17, 18 are substantially parallel and extend the entire length of the tube assembly 14.

Each individual tube 19 has a pair of C-shaped rings 20, 21 with each having a laterally disposed flange lying adjacent the outer surface of the tube 19 and a vertical flange extending radially from the laterally disposed flange. As shown in FIG. 2, the ring 20 is offset axially from one end of the tube 19 and the ring 21 is offset beyond the end of its respective tube 19. Consequently the rings 20, 21 form with their respective ends of their tubes 19 male and female joints respectively so that the end of the tube 19 carrying the ring 20 may extend under the ring 21. This insures a rather smooth and completely closed joint. Also, the degree of overlap will have considerable tolerance so that there may be a tight fit between the respective ends of the tubes. As is clearly evident in FIG. 2, the tube sections 19 are closed at their ends by the rings 20, 21 and specifically by the vertically extending flanges of the respective rings lying against one another and bolted together as at 23.

Each of the supports 15 includes an upright hollow tubular section which receives a vertical column 25 with its upper end rigidly fixed to an upwardly opening arcuate under carriage 26 that lies beneath the vertical flanges of the rings 20, 21. The arcuate portion 26 has a pair of upwardly projecting brackets 27, 28 which are disposed adjacent of the flanges of the rings 20, 21 and carry connecting pins 29, 30 that underlie the vertical flanges of the rings 20, 21. The tube assembly 14 is free to rotate on these pins and may swivel about the axis of the auger 13. Consequently the pins 29, 30 serve as guide means for the annular tracks formed by the connected flanges of the rings 20, 21.

Adjacent the end of the tube assembly 14 lying next to the hopper 10, is provided an indexing device 35, controlled by an indexing lever 36 which regulates the angular position of the tube assembly 14 at the end adjacent the hopper 10 and relative to the axis of the auger. Such a regulating device 35 may be of the type shown in U.S. Patent 2,867,314. On the opposite end of the tube assembly 14 is provided a pair of brackets 40, 41 on the arcuate member 26 which may be bolted to the radial flanges of the ring 20. Consequently that end of the auger assembly 14 is held against rotation.

Fixed to the outer surface of the tubular members 19 are a pair of elongated channels 45, 46 which lie adjacent to the edges 17, 18. The channels 45, 46, as is clearly evident in FIG. 3, is of an inverted U-shape with laterally extending flanges which lie on and being fixed to, by welding or other suitable means, the surface of the tubes 19. One flange of the upper channel 45 extends to and terminates at the edge 17 of the slot 16. One edge of the channel 46 extends and terminates at the edge 18 of the slot 16. The main portions of the channels 45, 46 are therefore offset slightly from the edges 17, 18.

Viewing FIG. 2, it becomes apparent that the channels 45, 46 extend the entire length of the tubes 19 and the flanges of the respective channels 45, 46 are removed at the ends so that the main portions thereof may overlie the lateral portions the rings 20. The edges of the rings 20, 21 are welded to the ends of the flanges on the channels 45, 46 and the main central portions of the channels 45, 46 are welded to the upper surface of the lateral flanges of the rings 20, 21. Therefore, there is provided a rigid supporting structure for each tube 19 composed of rings 20, 21 at opposite ends of the respective tube and the channels 45, 46 that interconnect the rings. The channels 45, 46, as previously mentioned, are fixed by welding or other suitable means to the outer face of the tubes 19.

Not only is the supporting structure, as described above, important for the structural reinforcement of the tubes 19, but also is it important for the fact that there is provided a relatively rigid structure and upon the lever 36 being moved to angularly relocate the adjacent end of the tube 19, the torsional load of the indexing device will effect twisting of the tube assembly and uniform inclination of the edges 17, 18 in the slot 16 progressively from a point adjacent the hopper 10 to its outer locked end. This will insure a uniform discharge of material from end to end of the tube assembly 14.

While only one form of the invention has been shown, it should be recognized that other forms and variations will occur to those skilled in the art. Therefore, the purpose of describing the present invention in concise and detailed manner was to emphasize the principles of the invention and it was not the intention to limit or narrow the invention beyond the broad concept set forth in the appended claims.

What is claimed is:

1. In an auger housing including an elongated auger tube having a side-opening slot offset laterally from the auger axis and defined by upper and lower substantially parallel edges extending the entire length of the tube, the improvement of a frame structure for the tube comprising: a pair of rings extending around and at respective opposite ends of the tube, each thereof being fixed to the tube and having a flange extending radially, and a pair of elongated channels on the outer surface of the tube extending substantially the full length thereof and disposed closely adjacent but offset above and below respectively the upper and lower edges of the slot; and means fixing opposite ends of the channels to the rings whereby said rings and said channels shall rigidify said housing so that torsional forces tending to distort the auger housing will effect uniform inclination of the slot edges throughout their length.

2. In a material feeding device including an elongated auger, a tube assembly for the auger composed of a series of auger tubes disposed in end to end relation, each of the tubes having a side-opening slot offset laterally from the auger axis and defined by upper and lower edges extending the entire length of the tube, the slots of each tube being alined longitudinally to define a continuous side discharge opening the length of the assembly, the improvement of frame structures for the tubes comprising: C-shaped rings extending around and at respective opposite ends of each tube with the open side of each being in registry with and substantially the dimension of the respective slot, and each thereof having a flange fixed to the surface of the respective tube and a flange extending radially; means fixedly connecting the radial flanges of the rings on the adjoining tubes; elongated channels on the outer surfaces of the tubes closely adjacent but offset from the respective upper and lower edges of the tube and extending substantially the full length of the respective tubes, said channels having opposite ends thereof fixed to the rings whereby said rings and said channels shall rigidify said tube assembly so that torsional forces tending to distort the tube assembly will effect uniform inclination of the slot edges throughout their length.

3. In a material feeding device including longitudinally spaced supports, an elongated auger, a tube assembly for the auger composed of a series of auger tubes disposed in end to end relation and carried on the supports, each of the tubes having a side-opening slot offset laterally from the auger axis and defined by upper and lower edges extending the entire length of the tube, the slots of the tubes being alined longitudinally to define a continuous side discharge opening the length of the assembly, and angular adjusting and holding means at opposite ends of the tube assembly for twisting the tube assembly, the improvement of frame structure for the tube assembly comprising: rings having radial and axial flanges extending around and at respective opposite ends of each tube, with each having a flange fixed to the surface of the respective tube; means fixedly connecting the radial flanges of the rings on the adjoining tubes; elongated rigid channels fixed to the outer surfaces of the tubes with each channel extending substantially the full length of the respective tube and having opposite ends rigidly fixed to the rings whereby said rings and said channels shall rigidify said tube assembly so that twisting of the tube assembly will result in uniform inclination of the edges of the slots.

4. In a material feeding device including longitudinally spaced supports, an elongated auger, a tube assembly for the auger composed of a series of auger tubes disposed in end to end relation and carried on the supports, each of the tubes having a side-opening slot offset laterally from the auger axis and defined by upper and lower edges extending the entire length of the tube, the slots of the tubes being alined longitudinally to define a continuous side discharge opening the length of the assembly, and angular adjusting and holding means at opposite ends of the tube assembly for twisting the tube assembly, the improvement of frame structure for the tube assembly comprising: rings fixed to and extending around respective opposite ends of each tube; means rigidly connecting the rings of adjoining tubes; elongated longitudinally extending rigid ribs rigidly fixed to the surfaces of the tubes and having opposite ends thereof rigidly connected to the rings whereby said rings and said ribs shall rigidify said tube assembly so that twisting of the tube assembly will result in uniform inclination of the edges of the slots.

References Cited by the Examiner

UNITED STATES PATENTS

| | | | |
|---|---|---|---|
| 559,338 | 4/96 | Lorenz | 198—213 |
| 2,630,906 | 3/53 | Philipp | 198—64 |
| 2,867,314 | 1/59 | Hansen | 198—64 |
| 2,921,670 | 1/60 | Albers | 198—213 |
| 2,948,385 | 8/60 | Todd | 198—213 |
| 3,001,633 | 9/61 | Heitshu | 198—213 X |
| 3,037,611 | 6/62 | Majorowicz | 198—64 |
| 3,107,005 | 10/63 | Cauffman | 198—213 |
| 3,111,115 | 11/63 | Best | 198—64 X |

SAMUEL F. COLEMAN, *Acting Primary Examiner.*

ABRAHAM BERLIN, ERNEST A. FALLER, JR., WILLIAM B. LA BORDE, *Examiners.*